(12) United States Patent
Vayanos et al.

(10) Patent No.: US 8,855,572 B2
(45) Date of Patent: Oct. 7, 2014

(54) METHOD AND APPARATUS FOR LINK CONTROL IN WIRELESS COMMUNICATIONS

(75) Inventors: Alkinoos Hector Vayanos, Ann Arbor, MI (US); Etienne F. Chaponniere, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 11/149,771

(22) Filed: Jun. 10, 2005

(65) Prior Publication Data

US 2006/0013257 A1    Jan. 19, 2006

Related U.S. Application Data

(60) Provisional application No. 60/580,458, filed on Jun. 16, 2004, provisional application No. 60/677,975, filed on May 4, 2005.

(51) Int. Cl.

| | | |
|---|---|---|
| H04B 17/00 | (2006.01) | |
| H04B 7/00 | (2006.01) | |
| H04B 7/216 | (2006.01) | |
| H04L 29/14 | (2006.01) | |
| H04L 12/801 | (2013.01) | |
| H04L 29/06 | (2006.01) | |
| H04L 12/823 | (2013.01) | |
| H04L 1/18 | (2006.01) | |

(52) U.S. Cl.
CPC ............... *H04L 1/1854* (2013.01); *H04L 69/40* (2013.01); *H04L 47/10* (2013.01); *H04L 69/16* (2013.01); *H04L 69/165* (2013.01); *H04L 47/14* (2013.01); *H04L 47/323* (2013.01)
USPC .......................... 455/67.11; 455/528; 370/320

(58) Field of Classification Search
CPC . H04L 1/1657; H04L 1/1848; H04L 12/1868; H04B 7/0621; H04B 52/48
USPC .................. 370/320, 342; 455/528, 67.11, 68
See application file for complete search history.

(56) References Cited

U.S. PATENT DOCUMENTS 6,581,176 B1 *  6/2003  Seo ............................... 714/749
6,608,818 B1    8/2003  Abrol et al. .................... 370/252
(Continued)

FOREIGN PATENT DOCUMENTS

| EP | I263159 | 12/2002 |
|---|---|---|
| JP | 2003514440 | 4/2003 |

(Continued)

OTHER PUBLICATIONS

Taiwan Search Report—TW094120046—TIPO—Jul. 27, 2011.

(Continued)

*Primary Examiner* — Andrew Wendell
(74) *Attorney, Agent, or Firm* — Howard Seo

(57) ABSTRACT

Methods and Systems are disclosed for use in a communication system 200 to selectively delay transmitting a second negative acknowledgement (NAK) after an initial NAK has already been sent requesting retransmission of a corrupted packet. The receiving entity 210 initiates a NAK prohibit timer 641 associated with a specific NAK 631 which prevents status reports to transmitting entity 220 from including a retransmission of the specific NAK until the timer expires. Use of the NAK prohibit timer 641 reduces the likelihood of spurious retransmissions from the transmitting entity 220 caused by a second NAK from the receiving entity 210 when the retransmission process has already been initiated.

26 Claims, 10 Drawing Sheets

(56) References Cited

U.S. PATENT DOCUMENTS

| | | | | |
|---|---|---|---|---|
| 2001/0055311 | A1 | 12/2001 | Trachewsky | 370/445 |
| 2002/0174395 | A1* | 11/2002 | Chen et al. | 714/748 |
| 2003/0012222 | A1* | 1/2003 | Rinchiuso | 370/468 |
| 2003/0191844 | A1* | 10/2003 | Meyer et al. | 709/227 |
| 2003/0227875 | A1* | 12/2003 | Wei et al. | 370/252 |
| 2004/0037224 | A1* | 2/2004 | Choi et al. | 370/235 |
| 2004/0208160 | A1* | 10/2004 | Petrovic et al. | 370/350 |
| 2007/0066275 | A1* | 3/2007 | Nagy et al. | 455/403 |
| 2007/0106924 | A1* | 5/2007 | Seidel et al. | 714/748 |
| 2008/0022180 | A1* | 1/2008 | Kuo | 714/748 |
| 2008/0301516 | A1* | 12/2008 | Han et al. | 714/748 |
| 2008/0317017 | A1* | 12/2008 | Wiemann et al. | 370/389 |

FOREIGN PATENT DOCUMENTS

| | | |
|---|---|---|
| JP | 2005039468 A | 2/2005 |
| JP | 2006504290 A | 2/2006 |
| KR | 2002-0089478 | 11/2002 |
| RU | 2073013 | 2/1997 |
| WO | WO02060214 A1 | 8/2002 |
| WO | 03067803 A1 | 8/2003 |

OTHER PUBLICATIONS

ETSI: "Universal Mobile Telecommunications System (UMTS)," RLC protocol specification, 3GPP TS 25.322 version 4.0.0 Release 4, ETSI TS 125 322 V4.0.0 (Mar. 2001), Technical Specification, 57 pages, 2001.

3rd Generation Partnership Project, "MAC protocol specification (Release 5)," 3GPP TS 25.321 V5.2.0 (Sep. 2002).

3rd Generation Partnership Project, "Radio Link Control (RLC) protocol specification (Release 6)," 3GPP TS 25.322 V6.0.0 (Dec. 2003).

Qualcomm R2-032476, "Differentiation of RLC PDUs at MAC-hs," 3GPP TSG-RAN WG2 Meeting #39, Nov. 17-21, 2003, San Diego, USA.

International Search Report—PCT/US05/021054—International Search Authority, European Patent Office—Oct. 6, 2005.

Written Opinion—PCT/US05/021054—International Search Authority, European Patent Office—Oct. 6, 2005.

International Preliminary Report on Patentability—PCT/US05/021054—IPEA, US—Sep. 25, 2006.

* cited by examiner

US 8,855,572 B2

METHOD AND APPARATUS FOR LINK CONTROL IN WIRELESS COMMUNICATIONS

CLAIM OR PRIORITY UNDER 35 U.S.C. §119

The present Application for Patent claims priority to Provisional Application No. 60/580,458 entitled "Method and Apparatus for Link Control in Wireless Communications" filed Jun. 16, 2004, and to Provisional Application No. 60/677,975 entitled "Method and Apparatus for Link Control in Wireless Communications" filed May 4, 2005, both provisional applications being assigned to the assignee hereof and both are hereby expressly incorporated by reference herein in its entirety.

BACKGROUND

1. Field

The present invention relates generally to wireless communications, and more particularly to link control in wireless communications.

2. Background

The increased demand for wireless resources to carry voice and data messages sometimes results in an increase in transmission errors due to competing signals being simultaneously transmitted. Transmission errors are also caused by inclement weather, signal strength shadows, electrical interference or other conditions affecting the air interface, resulting in one or more packets in a wireless communication being dropped or corrupted. When a dropped or corrupted packet occurs, additional wireless system resources are typically needed to retransmit the lost data.

FIGS. 1A and 1B depict a conventional scheme for recovering dropped or corrupted wireless packets in W-CDMA. The figures illustrate a typical timing relationship at the receiver between polls 120 received from the sender, dropped packets 101-105, status reports including NAKs (negative acknowledgments) 131-133, status-prohibit timers 141-143, and retransmitted packets 111-115. FIG. 1A shows the various signals 101-120 received at a receiver, while FIG. 1B shows NAKs 131-133 and retransmissions 111-115 being sent between the receiver and the sender. Slots 101-105 represent corrupted packets at the receiver.

Upon determining that packet 101 is corrupted, the receiver transmits back to the sender a status report which includes NAK 131 instructing the sender to initiate a retransmission of the corrupted packet 101. Conventional W-CDMA status reports typically have a requirement to include NAKs for all pending sequence number gaps that exist since the latest in-sequence received sequence number. This need to include all pending sequence number gaps in conventional status reports wastes valuable wireless resources. For example, wireless resources are wasted when a status report is sent back to the sender with NAKs for corrupted packets which are already in the process of being retransmitted, resulting in a second, unnecessary spurious retransmission from the sender.

To avoid triggering spurious retransmissions and wasting valuable wireless bandwidth, W-CDMA introduced a status-prohibit mechanism, the status-prohibit timers 141-143. A general status-prohibit timer is started as soon as any status report is sent out. Presently, W-CDMA requires that once the status-prohibit timer is started, no further status reports are transmitted until the timer runs out. Any polls received from the sender while a status-prohibit timer is running are delayed until the timer runs out. Upon detecting a corrupted packet the status report with the NAK for the corrupted packet is delayed until the pending status-prohibit timer expires.

In FIG. 1, as soon as the status report including NAK 131 is sent from the receiver, the status-prohibit timer 141 is started, which prevents the transmission of any further status reports until it expires. Thus, when corrupted packet 102 is detected (while status-prohibit timer 141 is still running), the status report with NAK 132 for corrupted packet 102 is delayed until status-prohibit timer 141 has timed out. By the time status prohibit timer 141 has timed out, the retransmission for corrupted packet 101 has been received at the receiver as retransmitted packet 111, as shown in FIGS. 1A and 1B. Once status-prohibit timer 141 has expired the receiver can send another status report which includes NAK 132 requesting a retransmission of corrupted packet 102, previously detected while status-prohibit timer 141 was still running.

The present invention is directed to overcoming, or at least reducing the effects of, one or more problems indicated above.

SUMMARY

Aspects of the invention disclosed herein address the above stated needs by providing a mechanism of status reporting for the RLC-AM mode which allows configuration flexibility and enables the reception of out-of-sequence PDUs.

According to various aspects of the invention, apparatus, methods and computer readable media are provided for controlling a communication link. The aspects include detecting, at a receiving entity, a corrupted packet from a transmitting entity and sending a negative acknowledgement (NAK) from the receiving entity back to the transmitting entity. In response to the NAK being sent a NAK prohibit timer associated with the corrupted packet is started.

According to an aspect of the invention the NAK prohibit timer is associated with a particular corrupted packet and prevents any additional NAKs from being sent for that particular corrupted packet until the NAK prohibit timer has expired. However, if other corrupted packets are detected the NAK prohibit timer does not prevent other NAKs from being sent for other corrupted packets. According to one aspect of the invention the NAK prohibit timer is initially set to run for one round-trip-time (RTT) or more.

According to an aspect of the invention an ACK prohibit timer is started. The ACK prohibit timer may have a duration with is either longer or shorter than the duration of the NAK prohibit timer, depending upon the desired responsiveness of advancing the RLC window forward. The ACK prohibit timer delays the sending of ACK-only status reports until the ACK prohibit timer expires. However, the ACK prohibit timer does not delay the sending of status reports containing NAKs.

According to an aspect of the invention an ACK counter is started upon sending an ACK from the receiving entity to the transmitting entity. The ACK counter increments for each in-sequence PDU received, keeping track of the extent to which the receiver window is filled up. If the ACK counter reaches a predefined threshold another ACK is sent. The predefined threshold may be defined as a percentage of an RLC window width.

DETAILED DESCRIPTION

Aspects of the invention are disclosed in the following description and related drawings directed to various embodiments of the invention. Alternate embodiments may be devised without departing from the spirit or the scope of the invention. In order to more clearly illustrate the invention, some elements that are very well-known to those of ordinary skill in the art may not be described in great detail, or may be omitted, so as not to obscure the relevant details of the invention.

The terms "transmitting entity" (or "sender") and "receiving entity" (or "receiver"), as used throughout this disclosure and the claims, refer to a communication station's relationship to a particular packet, e.g., a corrupted packet. The transmitting entity is the communication station or device that sent the packet. The receiving entity is the communication station or device that receives the packet, or, in the case of a corrupted packet, is intended to receive the packet. A device engaging in two-way communications is a transmitting entity for some packets and a receiving entity for other packets. Transmitting entities have both receiving circuitry and transmitting circuitry, as do receiving entities. Transmitting entities and receiving entities may either be wireless communications stations (e.g., mobile stations) or may be fixed stations communicating via cables or wires. The term "protocol data unit" (PDU), as used herein, is a unit of information, packet or frame, passed across a network or exchanged between peer layers in a network. The terms "PDU" and "packet" are used interchangeably herein, and are defined to have the same meaning.

Figure 2:
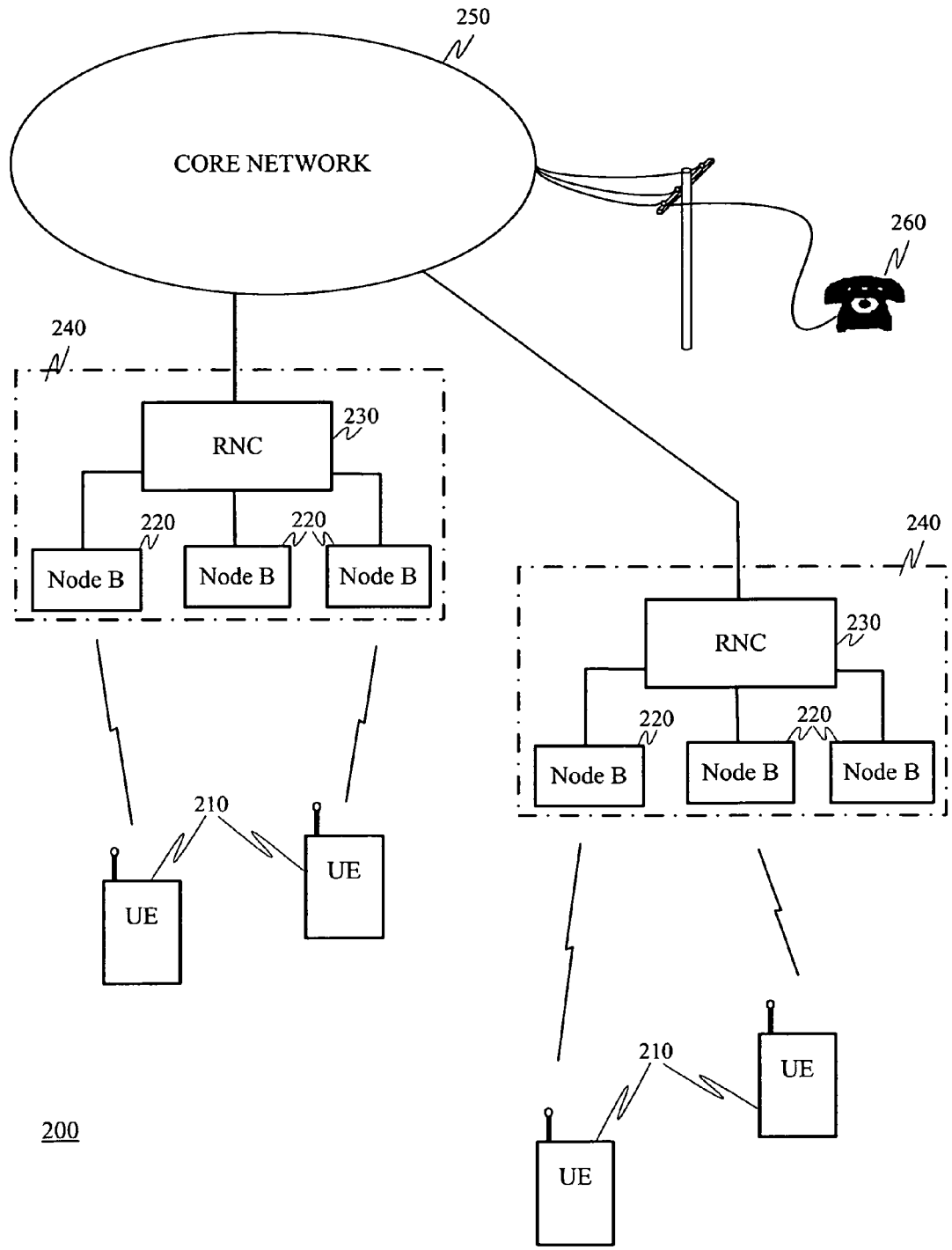
FIG. 2 depicts a network architecture that supports communication among wired and wireless stations in accordance with various embodiments of the invention.

FIG. 2 depicts a typical wireless network architecture 200 that supports communication among fixed stations and wireless stations in accordance with various embodiments of the invention. A number of competing systems have gained recent popularity for the wireless transmission of voice, data and content. One of these systems is W-CDMA (Wideband Code-Division Multiple Access) which was first released in December 1999 by 3GPP (Third Generation Partnership Project). The initial 1999 W-CDMA release is sometimes called R-99. Although many of the examples and explanations provided herein make reference to a W-CDMA system, various embodiments may be implemented in accordance with many other wireless or wired communications standards, including the various releases and implementations of W-CDMA, cdma2000, GSM/GPRS, or various other technologies.

The wireless system 200 includes a core network 250, one or more radio network subsystems 240, wireless user equipment 210 and wired user equipment such as the landline telephone 260. The radio network subsystems, RNS 240, in turn each include one or more radio network controllers, RNC 230, each communicatively connected to a number of base stations 220 (which are typically referred to as "Node-B" in W-CDMA). Depending upon the particulars of the implementation, the Node-B 220 may take various forms, be referred to by other names, or have aspects of other systems in common. For example, in some systems the Node B 220 base stations may be referred to as base transceiver station (BTS) or base station system (BSS). The radio network controller, labeled as RNC 230 in the figure, may, in some implementations, take other forms, be referred to by other names, or have aspects of other systems in common, for example, a base station controller (BSC), a Mobile Switching Center (MSC) or a Serving GPRS Support Node (SGSN). An SGSN is generally the core network entity dealing with packet-switched connections, and an MSC is the core network entity dealing with circuit-switched connections. FIG. 2 depicts wireless user equipment, UE 210, which may be known by many different names, for example, cellular telephones, mobile stations, wireless handsets, and the like. The scope of the invention covers these and other such systems, names, terms and implementations for the elements of like types of wireless systems.

The network depicted in the figure is merely exemplary and may include any system that allows communication over-the-air or via a fixed cable or wire communication path between and among components. The system may be connected in the manner depicted in FIG. 2, or otherwise as known by those of ordinary skill in the art. UE 210 and fixed station 260 may be embodied in the form of many different types of wired or wireless devices, including one or more of a telephone, cellular telephone, wirelessly connected computer, PDA (personal digital assistant), pager, navigation device, music or video content download unit, wireless gaming device, inventory control unit, or other like types of devices communicating wirelessly via the air interface. Cellular or other wireless telecommunication services may communicate with a carrier network through a data link or other network link via the fixed network 250 which may be the Public Switched Telephone Network (PSTN), the Internet, Integrated Services Digital Network (ISDN), one or more local area networks (LANs), wide area networks (WANs), virtual private network (VPNs), or other such networks. Communication may also take place using a fixed station 260 communicating via the PSTN or other fixed network 250.

The wireless system 200 controls messages or other information, typically sent to UE 210 as data packets via RNS 240. Each RNC 230 may be connected to one or more Node-B 220 base stations. In the event more than one Node-B 220 is associated with a particular UE 210, all of the Node-Bs 220 in the active set of that UE 210 may have the same notion of the E-DCH frame number, such that packets to or from two different Node-Bs 220 engaged in soft handover (SHO) with the UE 210 can be interpreted and sorted correctly. The subsystem RNS 240, including the RNC 230, controls the radio links between the Node-Bs 220 and the UE 210. Typically, the RNC 230 includes the logic (e.g., a processor or computer) to manage and control the wireless UE 210. The logic of the RNC 230 manages and controls functions such as call routing, registration, authentication, location updating, handovers and encoding schemes for the wireless UE 210 that are registered at a Node-B associated with the RNC 230.

The RNC 230 is connected to the Node-Bs 220 by a network configured for data transfer and/or voice information, generally via a network of fixed communication lines in a manner similar to the interconnection of network 250. Communications to and from various RNC 230 and Node-B 220 elements are typically carried out via this network of landlines which may include portions of the Internet and/or the PSTN. Upstream, the RNC 230 may be connected to multiple networks, such as those mentioned above (e.g., PSTN, Internet, ISDN, or the like), thus allowing wireless UE 210 devices access to a broader communication network. In addition to voice transmission, data may be transmitted using short message service (SMS) or other over-the-air (OTA) methods known in the art.

Each Node-B 220 has one or more transmitters and receivers to send and receive information to/from the one or more UE 210 associated or registered with that Node-B 220. Node-B 220 broadcasts data messages or other information wirelessly to UE 210 by OTA methods known to those of ordinary skill in the art. For example, the wireless signals between UE 210 and Node-B 220 may be based on any of several different technologies, including but not limited to, CDMA (code division multiple access), TDMA (time division multiple access), FDMA (frequency division multiplexed access), OFDM (orthogonal frequency division multiplexing) and any systems using a hybrid of coding technologies such as GSM, or other like wireless protocols used in communications or data networks.

Figure 3:
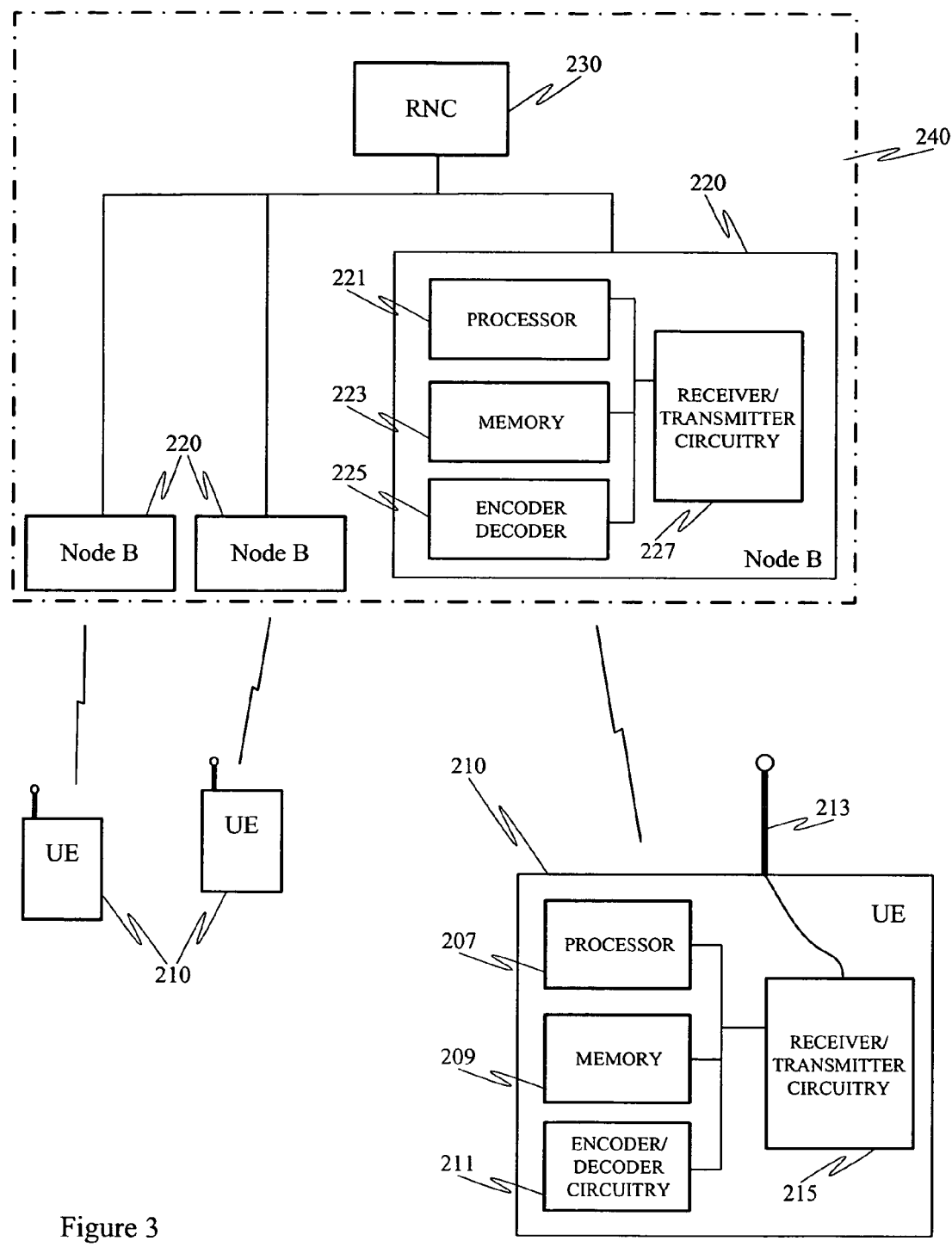
FIG. 3 depicts details of a mobile station and a fixed base station.

FIG. 3 depicts details of UE 210 and a Node-B 220. Node-B 220 includes an encoder/decoder 225 which encodes information to be transmitted and decodes received information in the appropriate coding protocol or scheme. Node-B 220 includes receiver/transmitter circuitry 227 for wirelessly receiving and transmitting packets from the UE 210, and for transmitting and receiving packets with the RNC 230 (which may be sent via a landline). Node-B 220 also includes a processor 221 which contains circuitry or other logic capable of performing or controlling the processes and activities involved in wireless communications, and in particular, the processes or activities set forth herein.

The Node-B 220 may also be configured to include a memory 223 for storing the various protocols, routines, processes or software to be used in conducting wireless communications as set forth herein. For example, the memory 223 may store one or more transmission, schemes, protocols or strategies for communicating with a UE 210. The transmission schemes, strategies and protocols include information concerning the timing for retransmissions due to lost or corrupted data, the redundancy version encoding (if any), and any encoding schemes or protocols to be used for the transmission and reception of wireless communications. This information may also be stored in memory of the RNC 230, and communicated to the Node-B 220 as needed or while performing periodic updates and system maintenance.

Embodiments of the UE 210, as shown in FIG. 3, typically include a processor or other logic 207, memory 209 and encoder/decoder circuitry 211 which perform functions similar to those of the corresponding parts of Node-B 220. For example, the encoder circuitry 211, or other like circuitry with the UE 210, may be configured to encode or otherwise encapsulate data into packets for transmission to Node-B 220. Each UE 210 also has an antenna 213, receiver/transmitter circuitry 215 and other electronics known to those of ordinary skill in the art for wirelessly receiving and transmitting information. The receiver circuitry 215 is configured to detect whether received packets are corrupted, and the transmitting circuitry is configured to send a NAK back to the transmitting entity (e.g., Node-B 220) for a corrupted packet. Both the Node-B 220 and the UE 210, as transmitting entities, should have sufficient memory to store enough packets to prevent stalling the window before an ACK is received to advance the window.

The UE 210 includes logic for controlling the functions of the UE 210, labeled in FIG. 2 as processor 207. In practice the logic may be configured in the form of one or more processing circuits executing resident configured logic, a microprocessor, a digital signal processor (DSP), a microcontroller, or a combination of these or other like hardware, software and/or firmware configured to at least perform the operations described herein, for example, the UE 210 activities described herein.

Depending upon the transmission conditions of the channel, bit errors can cause disruptions which may be addressed through error recovery or retransmission techniques. The probability that a frame contains a bit error tends to be a function of the bit error rate of the channel and the amount of data in the instance or length of the frame. The wireless system 200 may be implemented with one or more mechanisms for detecting and/or recovering from transmissions subject to bit-errors, for example, Automatic Repeat Request (ARQ) and/or Forward Error Correction (FEC) or hybrid ARQ (HARQ). HARQ systems add the use of forward error correction (FEC) in addition to the ARQ acknowledgement feedback techniques.

Wireless systems typically use a feedback channel that allows the receiver to send information back to the transmitter pertaining to the success or failure of the transmission. Error recovery schemes are often implemented using out-of-band feedback channels, although some error recovery schemes may be implemented using in-band feedback. ARQ may be implemented explicitly using a negative acknowledgment (NAK, sometimes represented as NACK) to request a retransmission. Alternatively, ARQ may be implemented implicitly using an acknowledgement (ACK) in conjunction with a timeout rule.

Upon receiving a transmission from UE 210, the Node-B 220 may be configured to send an ARQ signal to provide feedback regarding the transmission in the form of either an ACK or a NAK. For example, in a system with explicit out-of-band ARQ feedback, if data from UE 210 is corrupted or lost before being received by Node-B 220, the Node-B sends back a NAK indicating that the UE 210 should retransmit the failed transmission.

The wireless system 200 may be implemented as an R-99 W-CDMA system or in accordance with any of several other wireless standards or technologies. For example, the wireless system may conform to the Universal Mobile Telecommunication System (UMTS) Radio Link Control (RLC) Protocol Specification (3GPP TS 25.322 version 6.0.0 release 6), which is hereby expressly incorporated by reference herein, in its entirety. In R-99 W-CDMA the Radio Link Control (RLC) protocol handles the framing and retransmission functionality. The RLC protocol supports three separate transmission modes: transparent (RLC-TM), unacknowledged (RLC-UM) and acknowledged (RLC-AM). RLC, in combination with the physical layer, is flexible enough to allow the support of different types of QoS (e.g. different maximum delay and residual error rates). Except for minor enhancements, conventional RLC implementations have not been modified since its inception as part of R-99. Most of the original RLC components stem from the early stages of the UMTS development, and have remained unchanged since then. As new physical layer features were introduced, it was decided to avoid modifying RLC, and to instead try to address some of its limitations in other layers. This was done, for example, to accommodate the need for out-of-order reception of Protocol Data Units (PDUs) for High-Speed Downlink Packet Access (HSDPA).

R-99 W-CDMA uses a status-prohibit mechanism to ensure that there are no spurious retransmissions. R-99 also uses a number of polling schemes to ensure that at least one poll is received while the status prohibit mechanism is running. The R-99 status prohibit value is typically set to 40 or 60 ms longer than the expected round-trip time to account for the finite bandwidth available in performing the retransmissions. There are multiple mechanisms available for triggering status reports. For example, status reports may be sent periodically at fixed time intervals, or may be triggered due to a missing PDU if a break in the sequence number sequence is detected. Alternatively, a status report may be initiated in response to a poll received from the transmitting entity on the other end of the communication link requesting the status report. A poll may be indicated by the transmitting entity, for example, by setting a bit on the RLC-AM header.

As for the use of polls to trigger a status report, there are multiple mechanisms available for initiating the transmission of polls by the transmitting entity. The mechanisms for initiating polls include periodic polls, polling upon the last PDU in the transmission buffer, using a poll timer, window based polls, counter-based polling upon every Poll_PDU PDUs (protocol data unit) or upon every Poll_SDU SDUs (service data unit). These polling triggers operate as follows. For periodic polls a poll is triggered at predetermined periodic time intervals. For transmission buffer detection, a poll is initiated upon the detection of the last PDU in the transmission buffer or the retransmission buffer, e.g., the poll may be set on the header of the last PDU in the transmission or retransmission buffer. The transmission or retransmission buffer headers may be configured independently to achieve this. To use a poll timer, the poll is triggered a predetermined, fixed amount of time after the previous poll if the transmitted data has not yet been positively acknowledged after the timer expires. The poll timer scheme ensures redundancy in case a poll is lost. For window based polling a poll may be triggered after the transmission window has advanced more than a certain fraction of the transmission window.

For counter initiated polling upon every Poll_PDU PDUs, after the transmission of the Poll_PDU PDUs message, a poll is triggered when the state variable VT(PDU) reaches the value of Poll_PDU which is set by upper layers. The state variable VT(PDU) is incremented by one each time an AMD (Acknowledged Mode Data) PDU is transmitted (including PDU retransmissions). Similarly, for polling upon every Poll_SDU SDUs, a poll is triggered after the transmission of Poll_SDU SDUs when the state variable VT(SDU) reaches the value of Poll_PDU which is set by upper layers. The state variable VT(SDU) is incremented by one for a given SDU when the AMD PDU carrying the first SDU segment is scheduled to be transmitted for the first time.

The RLC-AM receiving entity maintains a number of state variables, including VR(R), VR(H) and VR(MR). The state variable VR(R) represents the latest in-sequence received sequence number. VR(R) marks the beginning of the receiver window. The state variable VR(H) is the highest sequence number for any PDU received. The state variable VR(MR) is the highest sequence number that will be accepted as valid. VR(MR) marks the end of the receiver window. As such VR(MR) is set to VR(R)+RxWindowSize. Regarding the terms RLC window, receiver window and transmission window, it is noted these terms are sometimes used interchangeably in the art even though they have different meanings. When an RLC is configured, two windows of the same size are created, a receiver window (sometimes called a reception window) at the receiving entity and a transmission window at the transmission entity. The reception window is advanced as in-sequence PDUs are received. If the PDUs are not received in sequence (e.g., there is a hole of one or more corrupted PDUs), then advancement of the reception window waits until a retransmission of the missing PDU is received or the missing PDU is discarded (e.g., if a maximum number of retransmissions was reached). The transmission window is advanced each time the transmission entity receives an ACK from the receiving entity indicating that the PDUs up to a certain PDU number have been properly received in sequence. The term RLC window is often used in reference to the RLC in general.

As explained above, each RLC status report in conventional systems is required to include NAKs for all the holes or data gaps detected in the receiver window. Therefore, conventional networks use a status prohibit that is slightly longer than the RLC round-trip time. For instance, in conventional R-99 W-CDMA implementations, the status prohibit value is typically set to be 40 to 60 ms longer than the expected round-trip time. In conventional W-CDMA configurations, during sustained data transmissions status reports are transmitted once per RLC round-trip time.

Figure 4:
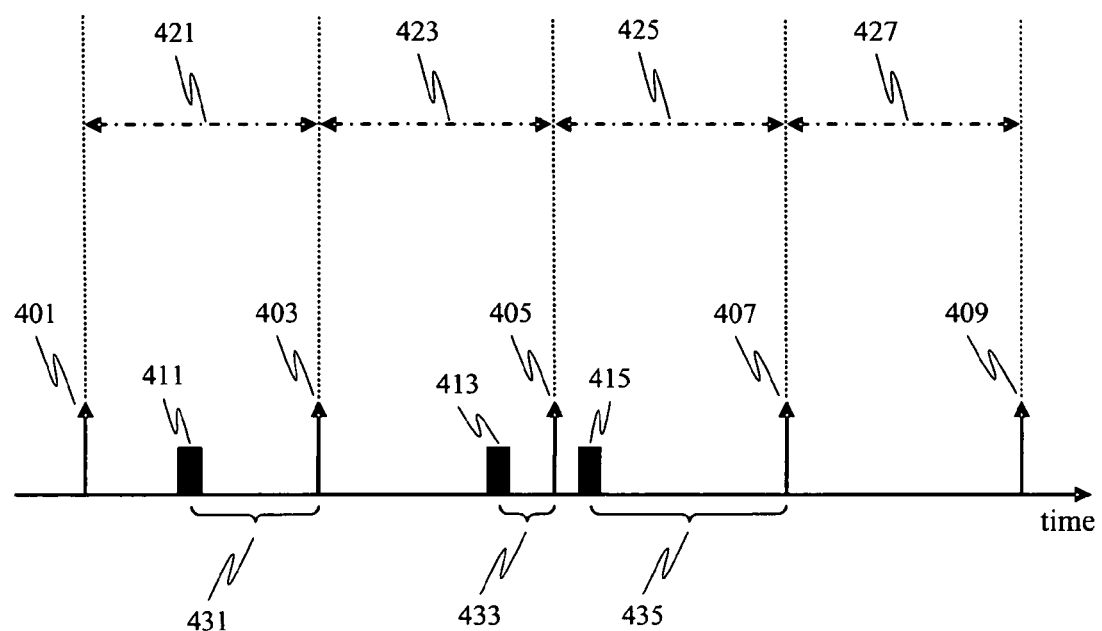
FIG. 4 illustrates delays affecting the retransmission of missing PDUs when no more than one status report is transmitted per RTT.

The present inventors recognized the drawbacks of delays due to transmitting only one status report per round-trip-time (RTT). The W-CDMA requirement that no further status reports be sent while a conventional status prohibit timer is running often causes delays in the retransmission of corrupted packets. FIG. 4 illustrates the delays of packets retransmitted to recover from missing or corrupted PDUs for the conventional scheme of only one status report being transmitted per RTT. In this example, identifiers 401, 403, 405, 407 and 409 represent status reports being transmitted from the receiving entity back to the transmitting entity. Upon transmitting status report 401, a status prohibit timer 421 is started. In accordance with conventional W-CDMA implementations, no status reports may be sent until the status prohibit timer 421 runs out. After status prohibit timer 421 has expired, the status report 403 may then be transmitted, following a delay of 431 due to the status prohibit timer 421. The same situation occurs for all status reports sent in conventional W-CDMA. Following each of the status reports 401-409, one of the status prohibit timers 421-427 is started and remains in effect for one RTT, or slightly more than one RTT. The prohibit timers 421-427 prevent the next status report from being sent out until the pending status prohibit timer 421-427 has expired. The status reports 401-409 include NAKs for all the holes detected in the respective receiver window (e.g., for corrupted PDUs 411, 413 and 415).

In this example, blocks 411, 413 and 415 indicate the detection of three new holes in the RLC sequence numbers. Because one of the status prohibit timers 421-427 is in effect when each hole is detected, there is a delay between the detection of a hole and the transmission of the corresponding NAK in the next status report. The delays for the holes 411, 413 and 415 are shown as 431, 433 and 435, respectively. Since the transmission errors are not correlated with the status report timing, the additional delay is uniformly distributed between zero (0) and the value of the status prohibit timer. In conventional systems, the length of the status prohibit timer is set near RTT. This means that the total delay between the time when a hole is detected and the time when the retransmission is received is equal, on the average, to 1.5 times the round-trip time. Note that only the first retransmission for a particular hole would be affected by this delay. If the first retransmission for the hole fails, then the second retransmission and every subsequent retransmission for that hole after that would only be delayed by one RTT.

For protocols such as RLC-AM and TCP, which rely on the transmitter window to perform flow control, acknowledgement transmissions, ACKs, are used to nudge the transmission window forward. For a window size that is relatively large, the delay in sending acknowledgements does not significantly affect performance. Yet, in conventional RLC-AM implementations, ACKs are sent with the same frequency regardless of whether or not there are any NAKs to report. The transmitting entity should be able to store a number of PDUs to ensure that there is no stalling of the window before an ACK is received to advance the window, assuming that there are no errors during the transmission. Typically, the amount of data that needs to be buffered by the transmitting entity between receptions of two consecutive status reports (e.g., the maximum buffered data) corresponds to the amount of data that can be transmitted in two times the round-trip time. The PDU buffering may be more important in HSDPA than in R-99, since, in HSDPA, the RLC window size tends to be more limited. For example, assuming a round-trip-time of 200 ms and a PDU size of 320 bits, the maximum achievable data rate would be: 2048×320/(2×0.2)=1.63 Mbps. In the case of HSDPA, the status-prohibit can often be configured as a smaller value since, in good channel conditions, the residual error rate is extremely low. However, if we use the same configuration across the cell, the users in areas having poor channel conditions would be affected by the large number of spurious retransmissions.

A drawback of conventional RLC is that the transmission of status reports more often than once per RTT may cause spurious retransmissions. But limiting status reports to no more than one per RTT, in turn, causes longer delays in advancing the RLC window and in sending NAKs for missing PDUs. Conventional RLC implementations include a number of constraints that make it impossible to adjust the NAK and ACK delays. For example, conventional status reports include NAKs for all the holes in the sequence number (SN), and status reports are sent at the same rate independent of whether any NAKs are present and despite the fact that ACKs may not need to be sent so often. This requirement of conventional RLC implementations causes spurious retransmissions unless the status reporting period is greater than the round-trip time.

Various embodiments disclosed herein provide more flexibility by independently tracking holes in the PDU sequence. In addition to the regular status-prohibit timer (which is applicable for all holes), a separate timer per hole is provided. This timer, called the NAK prohibit timer, does not prevent the transmission of a status PDU. The NAK prohibit timer for a given hole prevents the inclusion of NAKs referring to that hole in any status report that is transmitted, until the NAK prohibit timer for the given hole expires. The combination of polling and status prohibit allows the system to define the rate at which reports are generated, and also makes it possible to efficiently use the Missing PDU status report trigger.

Figure 1A:
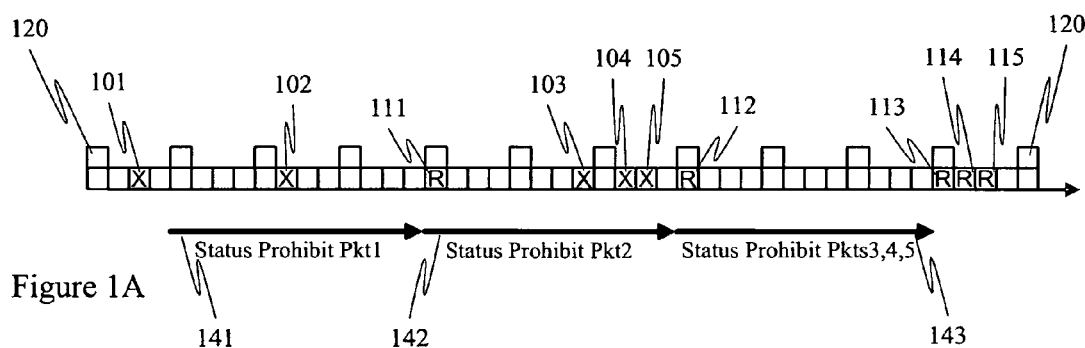
FIGS. 1A and 1B depict a conventional scheme for recovering dropped or corrupted packets.
Figure 1B:
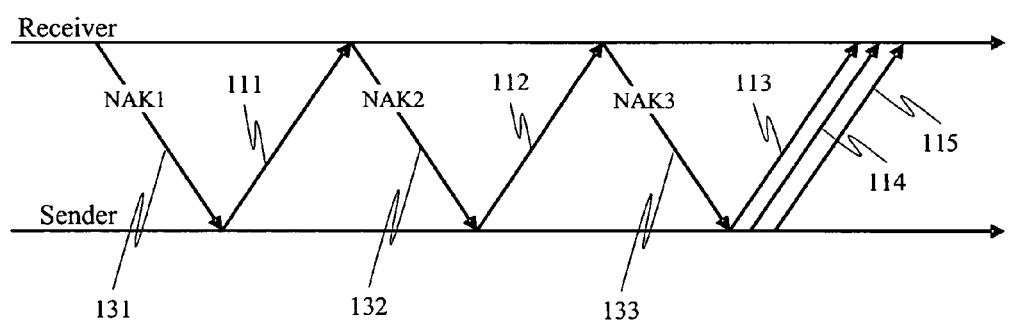

The conventional scheme, depicted in FIGS. 1A and 1B, may sometimes require fewer NAK transmissions (e.g., 131, 132 and 133) than the number of NAKs transmitted by various embodiments disclosed herein (e.g., FIGS. 5A-5B, 531, 532, 533 and 534). But the conventional scheme does not allow the delay in sending feedback to be reduced. The embodiments enable more flexibility in trading off feedback delay for an increased number of status reports. Sending more frequent status report transmissions in accordance with the embodiments disclosed herein tends to provide a more even distribution of the retransmissions. Further, the status prohibit timer of the various embodiments disclosed herein may be set to shorter values than the status prohibit timer of conventional systems without an increase in the probability of spurious retransmissions.

An ACK is sent from the receiving entity back to the transmitting entity every so often to report back the latest in-sequence received sequence number, that is, to update the beginning of the RLC window. An ACK will typically be included in a status report containing NAKs. However, if there are no NAKs available, depending on the supported window size, it may not necessarily make sense to trigger the transmission of an ACK. To avoid unnecessarily triggering an ACK when there is not a NAK to be sent, various embodiments disclosed herein provide an "ACK prohibit timer." This timer may be set to a longer value that the NAK prohibit timer. Status reports including NAKs would only be delayed if a status prohibit timer is running or if their associated NAK prohibit timer had not yet expired. However, ACK-only status reports—that is, status reports with only an ACK but no NAKs—would be delayed if either the status prohibit timer or the ACK prohibit timer is running. Since the NAK prohibit timer is NAK-specific in various embodiments, it would not affect the transmission of a status report with a different NAK or any ACK.

Figure 5A:
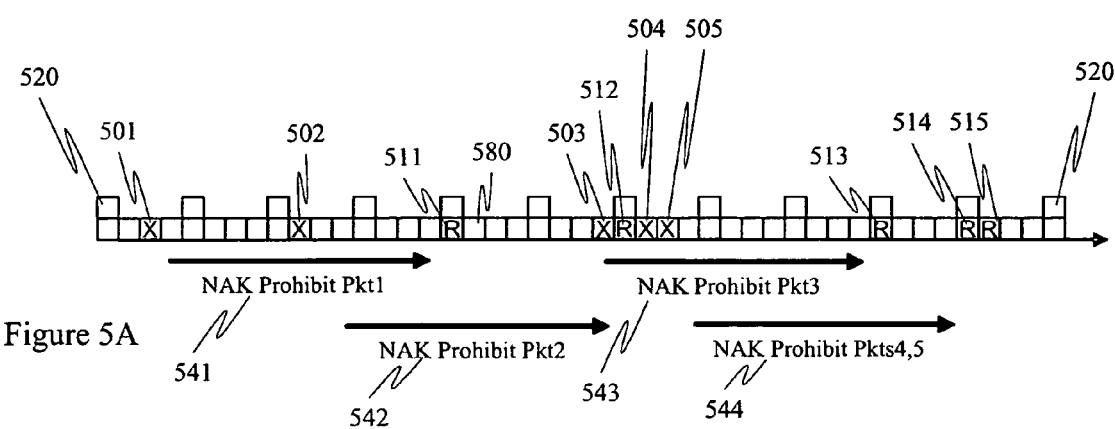
FIGS. 5A and 5B depict a scheme for recovering dropped or corrupted packets using a NAK prohibit timer in accordance with various embodiments of the invention.
Figure 5B:
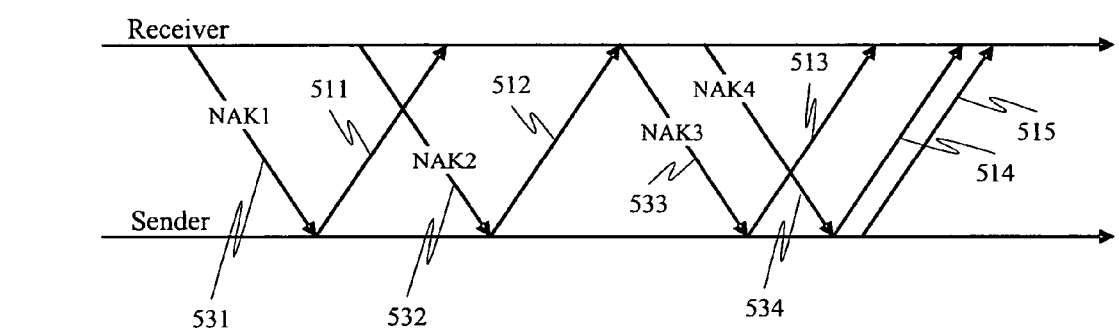

FIGS. 5A-B depict aspects of a scheme for recovering dropped or corrupted wireless packets, in accordance with various embodiments disclosed herein. FIG. 5A illustrates a NAK prohibit timer, showing an exemplary timing relationship at the receiving entity between the polls received from the transmitting entity 520, dropped packets 501-505, status reports sending NAKs 531-534 back to the transmitting entity, NAK prohibit timers 541-544, and retransmitted packets 511-515. Slots 501-505 represent corrupted packets at the receiving entity. While FIG. 5A shows the various signals 501-520 received at the receiving entity, FIG. 5B shows NAKs 531-534 and retransmissions 511-515 being sent between the receiving entity and the transmitting entity. For the sake of clarity, ACK prohibit timers and status prohibit timers are not considered in the explanation of NAK prohibit timers provided in conjunction with FIGS. 5A and 5B. ACK prohibit timers and status prohibit timers are discussed below in conjunction with FIGS. 6A and 6B.

Upon determining that a packet (e.g., packet 501) is corrupted, the receiving entity transmits back to the transmitting entity a status report which includes NAK 531 instructing the transmitting entity to initiate a retransmission of the corrupted packet 501. To avoid triggering a spurious retransmission, a NAK prohibit timer 541 is started. In accordance with various embodiments, a NAK prohibit timer is started as soon as a status report is sent out containing a NAK. Unlike the status-prohibit timers of conventional W-CDMA implementations, the NAK prohibit timer disclosed herein is NAK-specific. Being NAK-specific, a NAK prohibit timer only prevents further NAKs for a particular lost PDU, or if there is a hole of several consecutive lost PDUs the NAK prohibit timer prevents further NAKs for the consecutive lost PDUs of the hole until the NAK prohibit timer times out. As used herein, a NAK prohibit timer which is NAK-specific is said to be associated with one or more corrupted packets, and thus no additional NAKs will be sent for those one or more corrupted packets until the NAK prohibit timer expires. This is unlike a general status prohibit timer of the conventional art which prevents any further status reports at all until the timer runs out.

As shown in FIG. 5, as soon as the status report including NAK 531 is sent from the receiving entity, the status-prohibit timer 541 is started, thus preventing the transmission of further NAKs for corrupted packet 501 until expiration of NAK prohibit timer 541. However, since the NAK prohibit timer 541 is NAK-specific with respect to NAKs for corrupted packet 501, other NAKs for other corrupted PDUs are not blocked. Hence, upon detecting corrupted PDU 502 the receiving entity is able to send NAK 532 despite the fact that NAK prohibit timer 541 is still running. Polls received from the transmitting entity while a NAK prohibit timer is running do not need to be ignored on account of the NAK prohibit timer. As mentioned above, if there is a hole of two or more consecutive lost PDUs, the NAK prohibit timer prevents further NAKs for the consecutive lost PDUs of the hole until the NAK prohibit timer times out. For example, corrupted PDUs 504 and 505 make a hole of two consecutive lost PDUs. Rather than sending out two NAKs, overhead is conserved in some embodiments by sending out a single NAK 534 for the two corrupted packets 504 and 505. In such instances, a single NAK prohibit timer 544 may be started for the NAK 534 reporting both corrupted packets 504-505 of the hole. The NAK prohibit timer 544 is said to be associated both with lost PDU 504 and with lost PDU 505, thus preventing further NAKs from being sent for either of these two lost PDUs until expiration of NAK prohibit timer 544.

Regarding the transmission of status reports, and in particular, the timing of sending NAKs for corrupted packets, in general a status report will be sent upon receiving a poll sent from the transmitting entity. In various implementations, however, a status report containing a NAK may be sent upon detecting the corrupted PDU, without waiting for a poll. For example, in W-CDMA the "missing PDU indicator" option may be configured to send a NAK for a newly discovered corrupted PDU without waiting for a poll. Even with this option configured to send NAKs without waiting for a poll, the NAK may be delayed by a pending status prohibit timer.

Figure 6A:
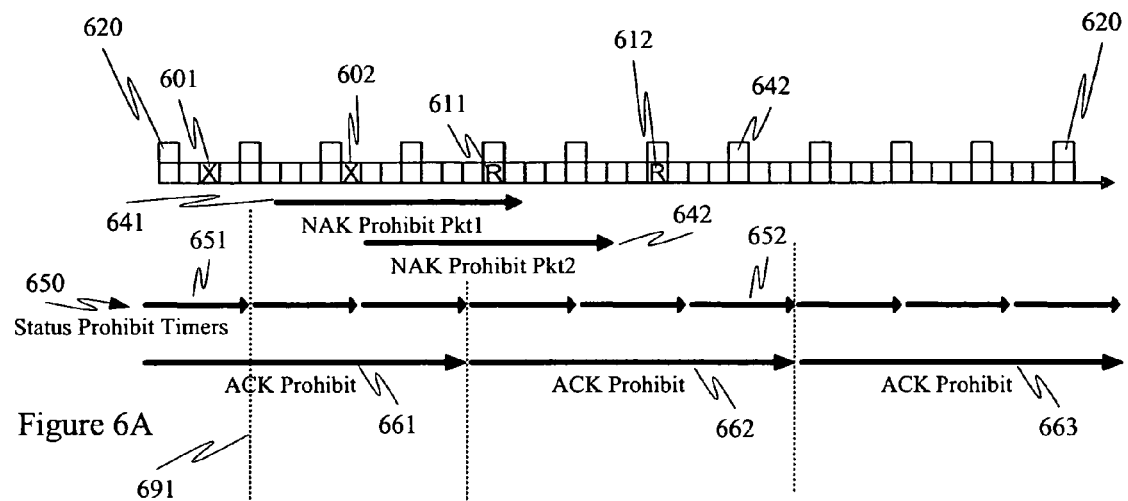
FIGS. 6A and 6B depict a scheme for recovering dropped or corrupted packets using a NAK prohibit timer, an ACK prohibit timer and a status prohibit timer in accordance with various embodiments of the invention.
Figure 6B:
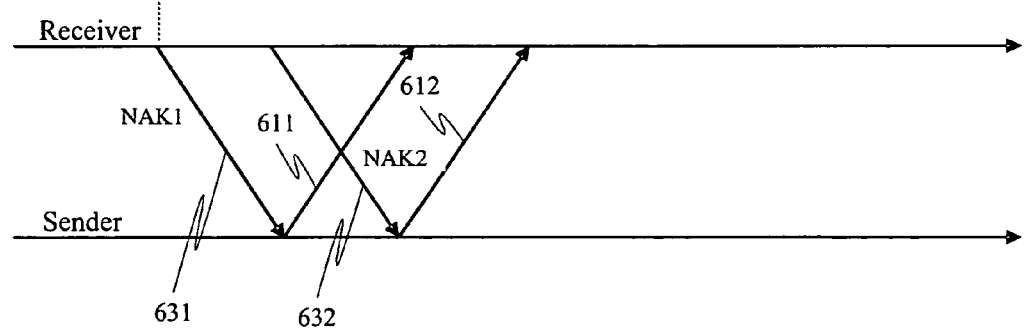

FIG. 6A illustrates the interplay between NAK prohibit timers, ACK prohibit timers and the status prohibit timers, in accordance with various embodiments. The figure depicts three types of timers, NAK prohibit timers 641-642, status prohibit timers 650, and ACK prohibit timers 661-663. The NAK prohibit timers are NAK-specific. This means that, once a NAK has been sent, until the NAK prohibit timer times out, it prevents the transmission of any additional NAKs for the corrupted PDU associated with the NAK prohibit timer, but it does not prevent NAKs from being sent for other lost PDUs. A NAK-specific NAK prohibit timer associated with one lost PDU does not prevent a NAK from being sent for a different lost PDU. NAK prohibit timers are generally set for slightly more than one RTT (e.g., sometimes 20-100 ms longer than an RTT). On the other hand, status prohibit timers are not NAK-specific. A status prohibit timer keeps any status report from being sent until it has timed out. Hence, if there is a NAK to send, the NAK is delayed until the pending status prohibit timer times out. Status prohibit timers may be set for any length of time, but in accordance with various embodiments, are typically set to be somewhat shorter in duration than an RTT. In this way, the state variable VR(R) for the latest in-sequence received sequence number (representing the beginning of the receiver window) is updated frequently, thus moving the RLC windows in a timely manner. The ACK timers prevent the transmission of status reports which only contain an ACK, and not a NAK until the pending ACK timer has timed out. However, ACK timers do not prevent or delay status reports which contain NAKs. Further, in some embodiments, if there is a NAK to send, the status report will be sent (since ACK timers do not delay NAKs) and the status report prompted by the NAK may also include an ACK as well since it is being sent anyway.

As PDUs are received, depending upon the channel conditions, the receiving entity may detect a corrupted packet from time to time (e.g., PDUs 601 and 602). In some implementations a NAK may be sent right away even though a poll has not been received from the transmitter, while in other implementations the receiving entity may wait until the next poll is received to initiate the transmission of a NAK. However, in either implementation a status report containing a NAK will not be sent if there is a pending status prohibit timer in effect. In the example illustrated in FIG. 6A, NAK 631 for the corrupted PDU 601 is not sent right away since status prohibit timer 651 is pending. NAK 631 for corrupted PDU 601 is delayed by the status prohibit timer 651 until it has timed out at time 691. It should be noted that at time 691, the ACK prohibit timer 661 is pending. However, since ACK prohibit timers do not delay or affect the transmission of NAKs, the NAK for corrupted packet 601 will be transmitted even though ACK prohibit timer 661 is presently running. Further, the status report containing NAK 631 may, in some embodiments, also include an ACK even though ACK timer 661 is in effect. Sending an ACK with the status report does not increase the overhead since the status report, initiated for NAK 631, was going to be sent anyway. In some embodiments, if an ACK accompanies a NAK in a status report sent while an ACK prohibit timer is in effect, the ACK prohibit timer may then be reset.

In conventional systems, status prohibit timers are generally equal to, or slightly greater than, RTT. In accordance with various embodiments disclosed herein, status prohibit timers may be much shorter in duration than RTT, often several times shorter (e.g., status prohibit timers 650). FIG. 6A depicts an exemplary case where the NAK prohibit timers (641-642) are approximately two and one-half times as long as the status prohibit timers, while the ACK prohibit timers are depicted to be three times as long as the status prohibit timers. By having the status prohibit timers much shorter than RTT, the various embodiments are able to update the state variable VR(R) for the latest in-sequence received sequence number, and thus keep the RLC window moving forward with less delay.

Figure 7:
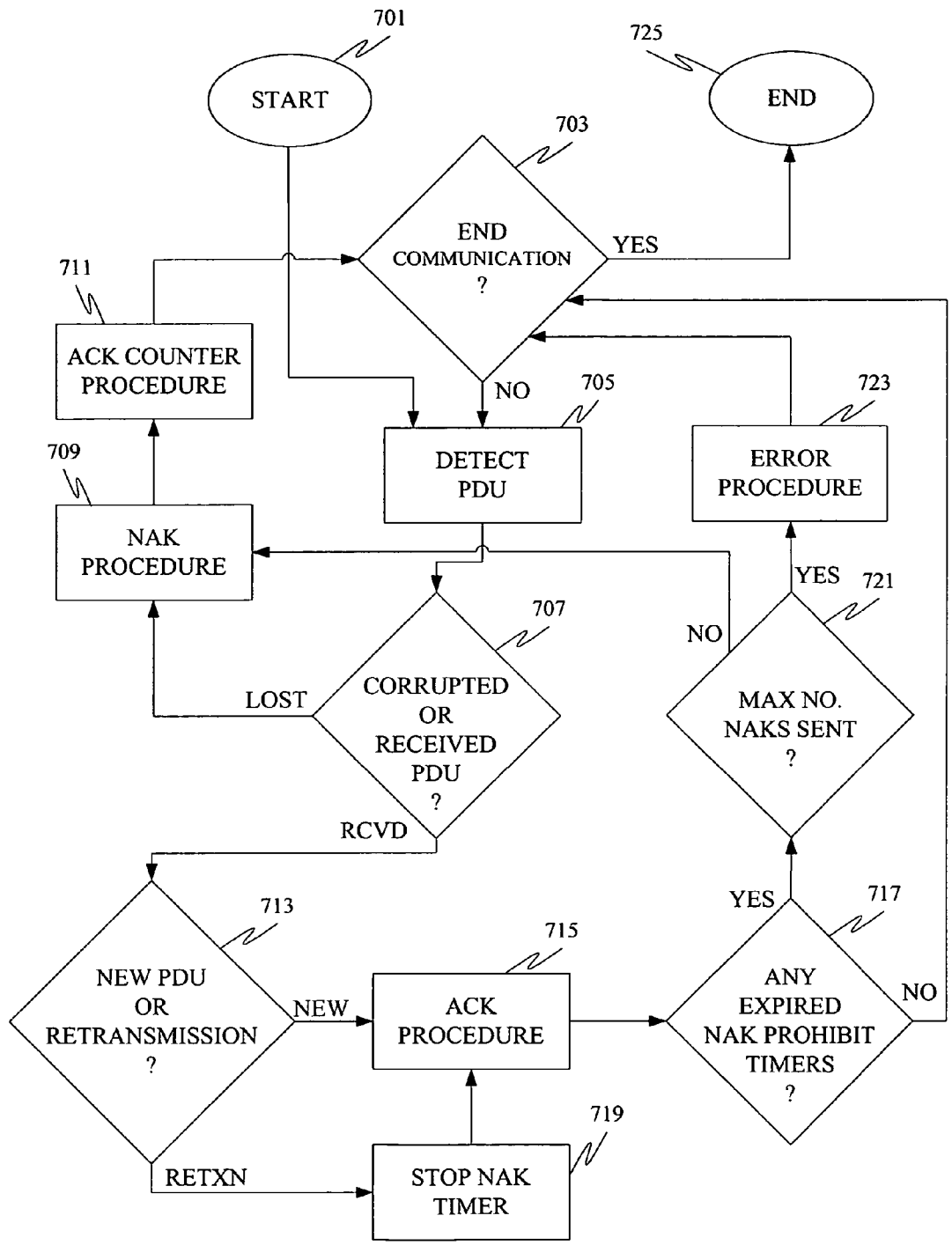
FIG. 7 depicts a method for link control in accordance with various embodiments of the invention.

FIG. 7 depicts a method for link control in accordance with various embodiments of the invention. The method begins at 701 and proceeds to 705 where a PDU is detected. In 705 data is expected to be received from a transmitting entity within a predetermined time period, timeslot or TTI (transmission time interval) at the receiving entity. For example, a receiving entity (e.g., UE 210 of FIG. 2) may be expected to receive a data packet from a transmitting entity (e.g., Node B 220) in a particular timeslot (e.g., 501 of FIG. 5A). The receiving entity is not necessarily limited to being a mobile station. The receiving entity could be a fixed station (e.g., Node B 220 or landline telephone 260 of FIG. 2), and the transmitting entity could be another fixed station or a mobile station. A particular station engaging in two-way communications will be a receiving entity of some PDUs and a transmitting entity of other PDUs. Upon detecting whether a PDU has been received the method proceeds from 705 to 707.

In 707 the receiving entity determines whether the PDU is correctly received (e.g., 511 or 580 of FIG. 5) or is corrupted (e.g., 501-505). A correctly received packet may either be a retransmitted packet (e.g., 511-515) or may be a packet transmitted for the first time, an initial transmission (e.g., 580 and the other packets of FIG. 5 which are not labeled). Further, a correctly received packet may be the result of a packet which had contained corrupted data but was recovered using error correction. A corrupted packet (sometimes called a lost packet) may contain erroneous or undecipherable data, or may not have been received at all. As part of 707 the receiving entity, in some embodiments, may perform an error check to determine whether the PDU is corrupted. The error check may involve any of several error checking routines or algorithms (e.g., a redundancy check such as checksum, a cyclical redundancy check (CRC), a frame check sequence (FCS), or error correction codes (ECC) such as Hamming codes, Reed-Solomon code, Reed-Muller code, Binary Golay code, convolutional code, turbo code, or other like type of error detection or detection/correction scheme). Checking whether the PDUs are correctly received or corrupted in block 707 may entail actions such as making a channel measurement or received power measurement, an implicit estimate of mobile unit reception quality, or any other like type of routine or test for errors in reception known to those of ordinary skill in the art. If, in 707, it is determined that the PDU is corrupted the method proceeds to 709 for the NAK procedure. The NAK procedure of block 709 is discussed in greater detail in FIG. 8.

Once the NAK procedure of block 709 has been completed the method proceeds to 711 to perform the ACK counter procedure. Some embodiments may have an ACK counter procedure implemented, while other embodiments do not. If the ACK counter procedure is not implemented, the method proceeds directly from 709 to 703 where it is determined whether the communication has ended. For embodiments which have an ACK counter procedure implemented, the procedure of block 711 is performed. The ACK counter procedure of block 711 is discussed in greater detail in FIG. 10. Once the ACK counter procedure has been completed the method proceeds to 703.

Back in 707, if it is determined that the PDU is correctly received, the method proceeds to 713 where it is determined whether the received PDU is an initial transmission of new data or a retransmission of data which was previously corrupted. If the PDU is determined to be new data, the method proceeds to 715 for the ACK procedure. If, in 713, the received PDU is determined to be a retransmission of a previously corrupted packet, the method proceeds to 719. In 719 the NAK prohibit timer associated with the retransmission is stopped or removed, if it still running. Since the retransmitted packet has been received, any NAKs associated with the retransmitted packet that may have been queued for transmission are no longer needed, and are therefore discarded without being sent. The method proceeds from 719 to 715. The ACK procedure of 715 is described in greater detail in FIG. 9. The ACK procedure of 715 results in either an ACK being transmitted, or if an ACK prohibit timer is in effect, an ACK being queued for transmission when the ACK prohibit timer expires.

Once the ACK procedure of 715 is completed, the method proceeds to 717 to determine whether there are any expired NAK prohibit timers from previously corrupted packets for which the retransmission has still not been received. Although the NAK prohibit timer may be set to any value within the receiving entity, it is generally advantageous to set the NAK prohibit timer to slightly greater than one round trip time (RTT). An RTT is the expected time it takes for a NAK to be transmitted back to the transmitting entity, be processed by the transmitting entity, and then have the transmitting entity send a retransmission to the receiving entity. The RTT value may depend somewhat upon the channel conditions, or in the case of a landline, the communications route for the signal. Setting the NAK prohibit timer to slightly more than one RTT tends to avoid spurious retransmissions, that is, one or more extra, unnecessary retransmission(s) caused by sending an additional NAK even though there was already a retransmission set in motion by an earlier NAK. Therefore, the NAK prohibit timers are typically set to approximately one RTT, or slightly greater than one RTT. For example, the NAK prohibit timers may be set to an RTT plus an additional transmission time interval (TTI), an RTT+2×TIIs, an RTT+3×TIIs, or possibly a longer time setting if the conditions warrant it. In some embodiments, the NAK prohibit timer setting may be measured as a percentage of the RTT, e.g., 110% or the like. For whatever value the timer is set to, once the NAK prohibit timer for a particular corrupted PDU has expired another NAK may be sent for that particular corrupted PDU. Although the sending of the second NAK (or subsequent NAKs) may occasionally result in spurious retransmissions, the delay in sending additional NAKs introduced by the NAK prohibit timer will significantly reduce the occurrence of spurious retransmissions.

If, in 717, it is determined that there is an expired NAK prohibit timer for which the retransmission was never received (or was corrupted), the method proceeds from 717 to 721 along the "YES" branch. In some systems there may be a limit to the number of NAKs to be sent for a particular corrupted packet, for example, to avoid stalling the communication. In such systems, block 721 determines whether the maximum number of NAKs have been sent for the packet. If not, the method proceeds from 721 along the "NO" branch to 709 to perform the NAK procedure and initiate another NAK for the corrupted packet. If, in 721, it is determined that the maximum number of retransmissions have been sent, the method proceeds from 721 along the "YES" branch to perform the error procedure in 723. The error procedure may entail error reporting to the system, and possibly an error recovery routine or data interpolation using data from adjacent packets, as a stop gap measure to fill in the PDU hole. Alternatively, the corrupted slot may be left blank. Upon completing the error procedure in 723 the method proceeds to 703.

Back in 717, if it is determined that there are no expired NAK prohibit timers for previously sent NAKs, the method proceeds from 717 to 703 along the "NO" branch. In 703 it is determined whether the communication has ended, for example, the data transmission has been completed, or one or the other users has been disconnected or hung up. If, in 703, it is determined that the communication has not ended, the method proceeds from 703 along the "NO" path to 705 to detect whether a PDU is received in the next slot. If the communication has ended the method proceeds from 703 along the "YES" path to 725 to perform the routine to end the communication, and the method ends.

Figure 8:
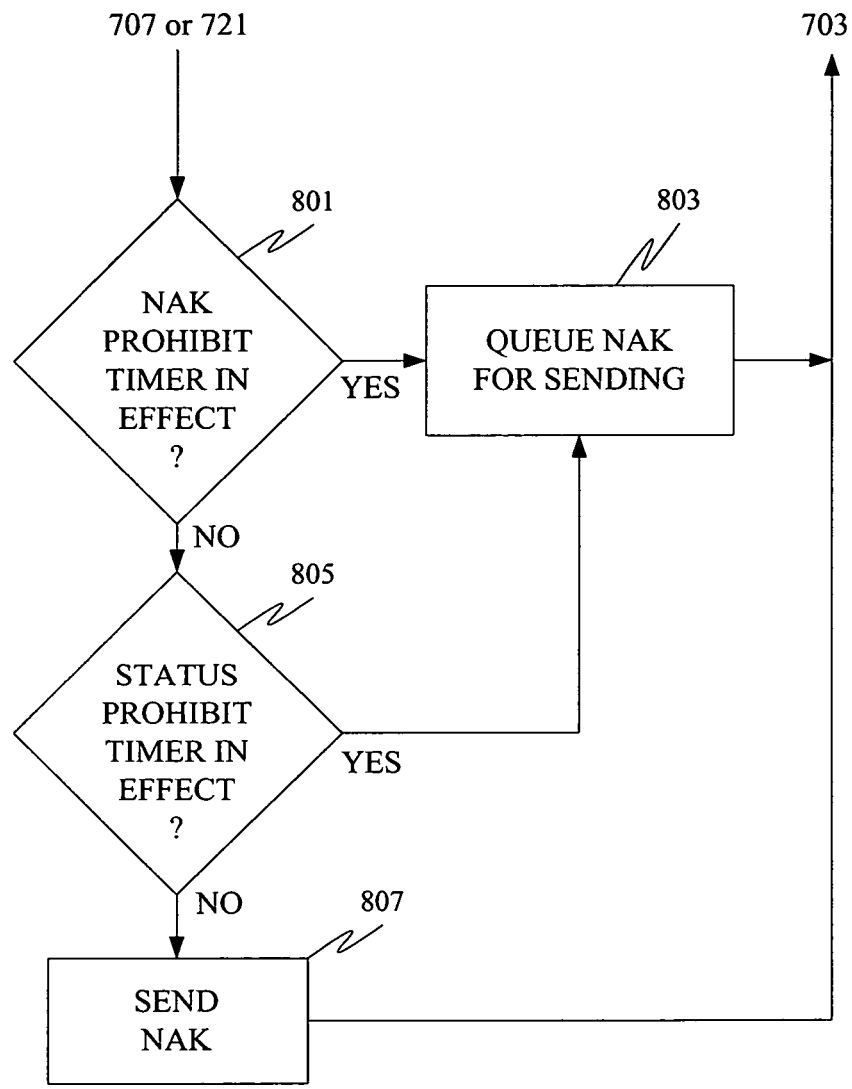
FIG. 8 depicts details of a method for controlling NAKs in accordance with various embodiments of the invention.

FIG. 8 depicts a method for initiating NAKs as part of link control in accordance with various embodiments of the invention. In particular, FIG. 8 depicts details of the NAK procedure of block 709 in FIG. 7. As such, 801 of FIG. 8 is typically performed following either 707 or 721 of FIG. 7. If 801 is being performed following 721, then there will be no NAK-specific NAK prohibit timer in effect for the corrupted data packet being processed, since it was determined in 717 that the previous NAK prohibit timer had expired. In 801 it is determined whether there is a NAK prohibit timer in effect which would prevent the NAK from being sent out in response to detecting a corrupted packet in 707. Quite often there will be no pending NAK prohibit timer since the corrupted packet is either an initial transmission for which there is no NAK prohibit timer, or else the corrupted packet is a retransmission for which the NAK prohibit timer is expired or nearly expired. For those situations in which the receiving entity is able to detect the identity of a corrupted packet to be that of a retransmission, the receiving entity may terminate the time remaining on the NAK prohibit timer since there is no need to further delay sending another NAK.

If, in 801, it is determined that there is a NAK prohibit timer in effect, the method proceeds from 801 along the "YES" branch to 803 to queue the NAK for sending at a later time after the NAK prohibit timer has expired. In some embodiments, the NAK may be sent in response to the NAK prohibit timer expiring while in other embodiments the system, upon determining there is a NAK to be sent, may check for a pending NAK prohibit timer and send the NAK if none is found. Once the NAK is queued for sending in 803, the method proceeds to 703 of FIG. 7. If, in 801 it is determined that there is no NAK prohibit timer in effect, the method proceeds from 801 to 805 along the "NO" branch.

In 805 it is determined whether there is a status prohibit timer pending which would prevent sending any status reports which contain the NAKs. The status prohibit timers, which are not specific to any particular packets or NAKs, are typically set to be somewhat shorter than an RTT in order to more responsively move the RLC window forward. Typically, the status prohibit timers may be set from times of one-half to one-tenth of an RTT. At the extremes, the status prohibit timers should be set to no more than one RTT and no less than one slot width. If, in 805 it is determined that a status prohibit timer is in effect the method proceeds from 805 along the "YES" branch to 803 to queue the NAK for sending when the status prohibit timer is no longer running. If, in 805 it is determined that there is no status prohibit timer in effect the method proceeds from 805 along the "NO" branch to 807. In block 807 a NAK is transmitted from the receiving entity to the transmitting entity, and the method proceeds to 703 of FIG. 7.

Figure 9:
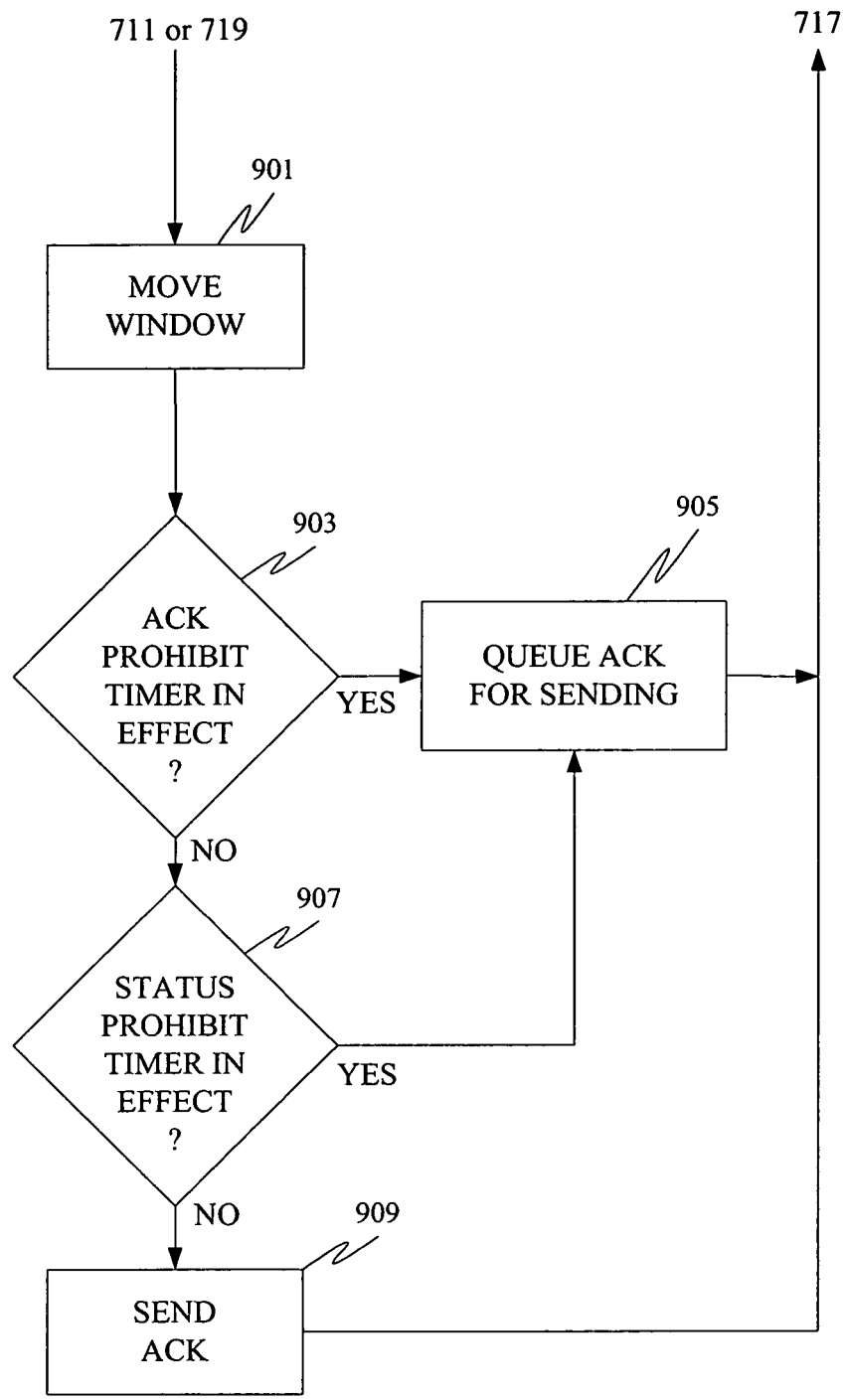
FIG. 9 depicts details of a method for controlling ACKs in accordance with various embodiments of the invention.

FIG. 9 depicts a method for initiating ACKs as part of link control, in accordance with various embodiments of the invention. In particular, FIG. 9 depicts details of the ACK procedure of block 715 in FIG. 7. As such, 901 of FIG. 9 is typically performed following either 713 or 719 of FIG. 7. In 901 it is determined how far the RLC window is to be moved, that is, up to what slot have all the PDUs been correctly received (including retransmissions) or otherwise accounted for. The state variable VR(R) represents the latest in-sequence received sequence number marking the beginning of the receiver window. Block 901 determines how far the window may be moved, for example, based on the value of the state variable VR(R). The timeslot or HARQ instance which is the last correctly received consecutive PDU is the one for which an ACK will be sent. In a status report, only one PDU need be acknowledged. Typically it is assumed, by prearranged convention, that all PDUs prior to the one specified in the ACK have been correctly received. In some other embodiments this may be achieved in a more cumbersome manner by listing all of the received PDUs rather than specifying the last correctly received PDU for moving the window forward. In 901 once it is decided how far to move the window and which PDU is to be acknowledged, the method proceeds to 903.

In 903 it is determined whether there is an ACK prohibit timer in effect. The ACK prohibit timer may be set to any of a wide range of values within the receiving entity depending upon the parameters of the communication and the demand for timely data. For example, for relatively high data rates the ACK prohibit timer may be set to a value somewhat shorter than one RTT in order to more responsively advance the receiver window forward. On the other hand, for relatively low data rates the ACK prohibit timer may be set to a longer value than the NAK prohibit timer (which is often set to slightly more than one RTT), especially if there is not an urgent need to advance the receiver window forward. Further, if an ACK counter is implemented the value used for the ACK prohibit timer may be set to a relatively large value since the ACK prohibit timer serves as a stop gap measure.

If, in 903, it is determined that an ACK prohibit timer is running the method proceeds from 903 along the "YES" branch to 905 to queue the ACK for transmission once the ACK prohibit timer has expired. In some embodiments the ACK may be sent in response to the ACK prohibit timer expiring while in other embodiments the receiving entity, upon determining there is an ACK to be sent, may check for a pending ACK prohibit timer and send the ACK if none is found. Once the ACK is queued for sending in 905 the method proceeds to 717 of FIG. 7. If, in 903 it is determined that there is no ACK prohibit timer in effect the method proceeds from 903 to 907 along the "NO" branch.

In 907 it is determined whether there is a status prohibit timer pending which would prevent sending any status reports containing the ACK. If it is determined that a status prohibit timer is presently running the method proceeds from 907 along the "YES" branch to 905 to queue the ACK for sending when the status prohibit timer is no longer running. If, in 907, it is determined that there is no status prohibit timer in effect the method proceeds from 907 along the "NO" branch to 909. In block 909 an ACK is transmitted from the receiving entity to the transmitting entity, and the method proceeds to 717 of FIG. 7. In either 909 or in 905, if a new ACK prohibit timer setting is determined to be appropriate the prevailing conditions, it is communicated to the transmitting entity via the ACK of 909 or 905.

Figure 10:
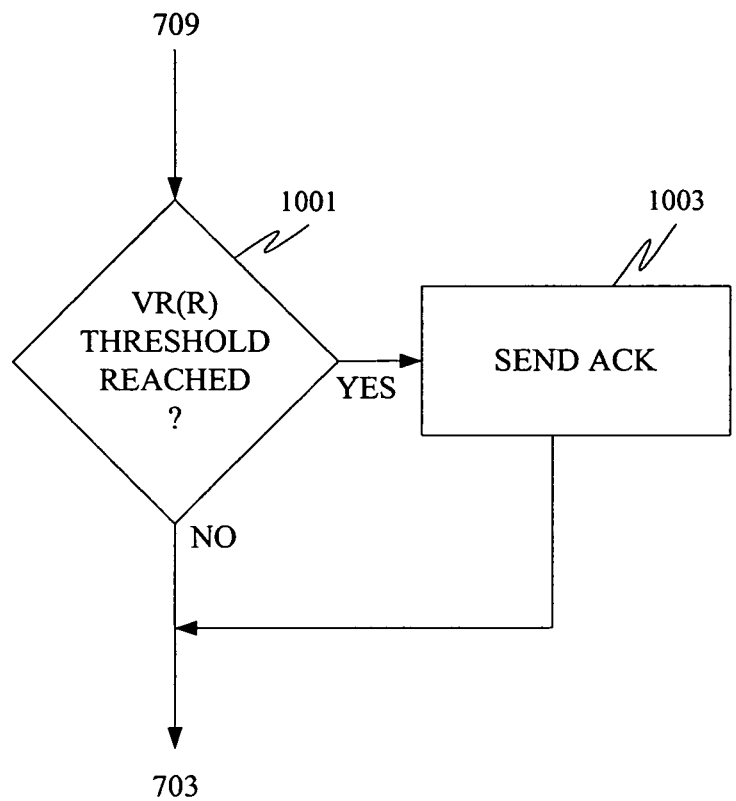
FIG. 10 depicts the ACK counter procedure which may be used to adjust the ACK reporting period in accordance with various embodiments of the invention.

FIG. 10 depicts the ACK counter procedure which may be used to adjust the ACK reporting period in accordance with various embodiments disclosed herein. In particular, FIG. 10 depicts details of the ACK counter procedure of block 711 from FIG. 7. Block 1001 of FIG. 10 is typically performed following 709 of FIG. 7. If an ACK counter is in effect the ACK prohibit timer may be set for a relatively long value since the ACK reporting function is primarily initiated by the ACK counter.

The ACK counter adapts the ACK reporting period to accommodate the current data transmission rate, thus helping to keep the RLC window efficiently sliding forward. In the absence of an ACK counter, the transmitting entity communicates new ACK prohibit timer values to the receiving entity as transmission conditions change, e.g., if the transmission data rate changes. If ACK Prohibit timer is not adjusted accordingly as the data rate changes the RLC throughput may be limited or may possibly even stall. For example, the RLC throughput would become limited if the ACK Prohibit timer is set to a relatively large value and the data rate suddenly increased. By the same token an unnecessarily large signaling load may occur on the opposite direction from the receiving entity back to the transmitting entity, for example, if the ACK Prohibit timer is set to a relatively low value and the rate suddenly decreases.

To avoid having the ACK prohibit timer set to an inefficient value for the transmission data rate, various embodiments disclosed herein have an ACK_Counter variable that allows the receiving entity to track the amount by which the VR(R) value has increased since the last ACK value was reported. Since the state variable VR(R) represents the latest in-sequence received sequence number, the ACK counter indicates the extent to which the receiver window is filled up. If ACK_Counter passes a predetermined threshold, the ACK can be reported with the next status report sent, thus avoiding the aforementioned performance drawbacks. The threshold may be defined either in increments associated with various data rates, or as a percentage of the configured receiver window size.

The state variable VR(R) represents the latest in-sequence PDU received at the receiving entity. Each time another consecutive PDU is correctly received at the receiving entity the state variable VR(R) is incremented. In 1001 of FIG. 10 it is determined whether VR(R) has reached a threshold value. The threshold may be defined as a percentage of the configured receiver or RLC window size, such as values from 10% to 50% of the receiver window. Alternatively, other smaller or larger percentages of the window size may be used which are suitable for link control conditions, e.g., up to 80% or more of the window size. If, in 1001, it is determined that VR(R) has reached the threshold, the method proceeds along the "YES" path from 1001 to 1003. In 1003 a new ACK prohibit timer setting is determined which is appropriate for the communication conditions, and then communicated to the transmitting entity via an ACK. Once the ACK containing the adjustment for the ACK prohibit timer has been sent from the receiving entity to the transmitting entity the method proceeds from 1003 back to 703 of FIG. 7. One advantage of using the ACK counter is that the frequency of the ACK reports may now be readily adapted to the rate conditions. For relatively high transmission data rates, ACKs will be reported more often, allowing the RLC window to advance faster. If the rate reduces dramatically, ACKs may be adjusted to be reported less often, thus reducing the signaling load on the opposite direction. In order to avoid a situation in which the ACK value is never reported, the ACK Prohibit timer described in conjunction with FIG. 9 may be maintained. Keeping the ACK reporting period set to a relatively large value does not tax the system feedback resources by a very great amount. In a manner of speaking, when the ACK counter is enabled the ACK Prohibit timer may be thought of as acting as a maximum bound value for the ACK reporting period. Similarly, for the highest data rates, the ACK report frequency may be bounded on the lower end by the status prohibit timer.

The figures are provided to explain and enable the invention and to illustrate the principles of the invention. Some of the activities for practicing the invention shown in the method block diagrams of the figures may be performed in an order other than that shown in the figures, or may be omitted entirely. For example, in FIG. 7 the determination of whether the communication is ending (703) may take place at the same time or after the detecting the next PDU (705). Similarly, the ACK counter procedure (711) may be performed before the NAK procedure (709) in some embodiments, following the detection of the next PDU (705) in other embodiments, or may not be implemented at all in some embodiments.

Those of skill in the art understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Those of skill further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The word "exemplary" as used herein means "serving as an example, instance, or illustration." The embodiments and features described herein as "exemplary" are not necessarily to be construed as preferred or advantageous over other embodiments or features of the invention.

The foregoing description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of controlling a communication link comprising:
 determining at a receiver whether a packet from a transmitter is received correctly, or is corrupted or lost;
 provided the packet is determined to be received correctly, determining if the packet is new or a retransmission;
 provided the packet is determined to be received correctly, sending an acknowledgement packet (ACK) provided a status prohibit timer is not running and provided an ACK prohibit timer is not running;
 provided the packet is determined to be received correctly and is determined to be a retransmission, stopping an existing negative acknowledgement (NAK) prohibit timer associated with the packet if still running; and provided the packet is determined to be lost or corrupted, and provided there is no existing NAK prohibit timer associated with the packet that is still running, sending a negative acknowledgement packet (NAK) to the transmitter and starting a new NAK prohibit timer associated with the packet in response to the sending of the NAK.

2. The method as described in claim 1, wherein the new NAK prohibit timer is initially set to run for at least one round-trip-time (RTT).

3. The method as described in claim 1, further comprising:
receiving at the receiver a poll from the transmitter; and
sending, in response to the pole, a status report from the receiver to the transmitter prior to the new NAK prohibit timer expiring;
wherein the status report does not include further NAKs associated with the packet.

4. The method as described in claim 1, wherein the NAK is transmitted wirelessly to the transmitter.

5. The method as described in claim 1, wherein the NAK is transmitted wirelessly to the transmitter in accordance with W-CDMA protocols.

6. The method as described in claim 1, wherein the status prohibit timer is initialized to have a shorter duration than said NAK prohibit timer when started.

7. The method as described in claim 6, further comprising:
sending a status report;
wherein said status report comprises an ACK and said NAK; and
wherein the status prohibit timer delays said status report from being sent until the status prohibit timer has expired.

8. The method as described in claim 1, further comprising:
starting an ACK counter upon sending the ACK from the receiver to the transmitter; and
sending a second ACK if the ACK counter reaches a predefined threshold.

9. The method as described in claim 8, wherein the predefined threshold is defined as a percentage of a receiver window width.

10. The method as described in claim 1, wherein the packet is a first corrupted packet with a next consecutive packet being a second corrupted packet, the method further comprising:
sending the NAK to the transmitter reporting both the first and the second corrupted packets;
wherein the new NAK prohibit timer is associated with both the first and the second corrupted packets.

11. A non-transitory computer readable media encoded with a computer program, the computer program when executed by a processor causes the processor to perform a method of controlling a communication link, the method comprising:
determining at a receiver whether a packet from a transmitter is received correctly, or is corrupted or lost;
provided the packet is determined to be received correctly, determining if the packet is new or a retransmission;
provided the packet is determined to be received correctly, sending an acknowledgement packet (ACK) provided a status prohibit timer is not running and provided an ACK prohibit timer is not running;
provided the packet is determined to be received correctly and is determined to be a retransmission, stopping an existing negative acknowledgement (NAK) prohibit timer associated with the packet if still running; and
provided the packet is determined to be lost or corrupted, and provided there is no existing NAK prohibit timer associated with the packet that is still running, sending a negative acknowledgement packet (NAK) to the transmitter and starting a new NAK prohibit timer associated with the packet in response to the sending of the NAK.

12. The non-transitory computer readable media as described in claim 11, wherein the new NAK prohibit timer is initially set to run for at least one round-trip-time (RTT).

13. The non-transitory computer readable media as described in claim 11, the method further comprising:
receiving at the receiver a poll from the transmitter; and
sending, in response to the poll, a status report from the receiver to the transmitter prior to the new NAK prohibit timer expiring;
wherein the status report does not include further NAKs associated with the packet.

14. The non-transitory computer readable media as described in claim 11, wherein the NAK is transmitted wirelessly to the transmitter.

15. The non-transitory computer readable media as described in claim 11, wherein the NAK is transmitted wirelessly to the transmitter in accordance with W-CDMA protocols.

16. The non-transitory computer readable media as described in claim 11, wherein the status prohibit timer is initialized to have a shorter duration than said NAK prohibit timer when started.

17. The non-transitory computer readable media as described in claim 16, further comprising: sending a status report;
wherein said status report comprises an ACK and said NAK; and
wherein the status prohibit timer delays said status report from being sent until the status prohibit timer has expired.

18. The non-transitory computer readable media as described in claim 11, further comprising:
starting an ACK counter upon sending the ACK from the receiver to the transmitter; and
sending a second ACK if the ACK counter reaches a predefined threshold.

19. The non-transitory computer readable media as described in claim 18, wherein the predefined threshold is defined as a percentage of a receiver window width.

20. A receiver configured to receive packets via a communication link, the receiver comprising:
receiver circuitry configured to determine whether a packet received from a transmitter is received correctly, or is corrupted or lost;
the receiver circuitry further configured to, provided the packet is determined to be received correctly, determine if the packet is new or a retransmission;
transmitter circuitry configured to, provided the packet is determined to be received correctly, send an acknowledgement packet (ACK) provided a status prohibit timer is not running and provided an ACK prohibit timer is not running; and
a processor configured to
provided the packet is determined to be received correctly and is determined to be a retransmission, stopping an existing negative acknowledgement (NAK) prohibit timer associated with the packet if still running; and
provided the packet is determined to be lost or corrupted, and provided there is no existing NAK prohibit timer associated with the packet that is still running, cause the transmitter circuitry to send a negative acknowledgement packet (NAK) to the transmitter and start a new NAK prohibit timer associated with the packet in response to the sending of the NAK.

21. The receiver as described in claim 20, wherein the status prohibit timer is initialized to have a shorter duration than said NAK prohibit timer when started.

22. The receiver as described in claim 20,
wherein the ACK prohibit timer is initialized to have a duration longer than said NAK prohibit timer when started;
wherein, upon being started, the ACK prohibit timer is configured to delay sending an ACK-only status report until the ACK prohibit timer expires.

23. The receiver as described in claim 20, further comprising:
an ACK counter configured to be started upon sending the ACK from the receiver to the transmitter;
wherein the ACK counter is configured to send a second ACK if the ACK counter reaches a predefined threshold.

24. The receiver as described in claim 23, wherein the predefined threshold is defined as a percentage of a receiver window width.

25. An apparatus comprising:
means for determining at a receiver whether a packet from a transmitter is received correctly, or is corrupted or lost;
the means for determining further including, provided the packet is determined to be received correctly, determining if the packet is new or a retransmission;
means for sending a negative acknowledgement (NAK) to the transmitter, to send, provided the packet is determined to be received correctly, an acknowledgement packet (ACK) provided a status prohibit timer is not running and provided an ACK prohibit timer is not running, and to, provided the packet is determined to be lost or corrupted, and provided there is no existing NAK prohibit timer associated with the packet that is still running, send a negative acknowledgement packet (NAK) to the transmitter; and
means for starting or stopping a NAK prohibit timer, to stop an existing negative acknowledgement (NAK) prohibit timer associated with the packet if still running provided the packet is determined to be received correctly and is determined to be a retransmission, and to start a new NAK prohibit timer associated with the packet in response to the sending of the NAK provided the packet is determined to be lost or corrupted and provided there is no existing NAK prohibit timer associated with the packet that is still running.

26. The apparatus of claim 25, wherein the new NAK prohibit timer is initially set to run for at least one round-trip-time (RTT).

\* \* \* \* \*